United States Patent
Hofstraat

(12) 
(10) Patent No.: US 6,337,944 B1
(45) Date of Patent: Jan. 8, 2002

(54) POLYMERIC OPTICAL WAVEGUIDE DOPED WITH A LANTHANIDE-SENSITIZER COMPLEX

(75) Inventor: Johannes Willem Hofstraat, Veldhoven (NL)

(73) Assignee: JDS Uniphase Photonics C.V., Arnhem (NL)

( * ) Notice: Subject to any disclaimer, the term of this patent is extended or adjusted under 35 U.S.C. 154(b) by 0 days.

(21) Appl. No.: 09/388,853

(22) Filed: Aug. 1, 1999

Related U.S. Application Data

(63) Continuation of application No. PCT/EP98/01286, filed on Feb. 28, 1998
(60) Provisional application No. 60/042,355, filed on Mar. 24, 1997.

(30) Foreign Application Priority Data

Mar. 3, 1997 (NL) .......................... 972000616

(51) Int. Cl.$^7$ .............................. G02B 6/00; H01S 3/00
(52) U.S. Cl. ...................... 385/143; 385/141; 359/342; 436/74; 549/348; 549/352; 534/15
(58) Field of Search .................................. 385/141, 142, 385/143; 359/342; 436/74; 549/348, 352, 353; 534/15; 372/40

(56) References Cited

U.S. PATENT DOCUMENTS

| | | | | |
|---|---|---|---|---|
| 4,037,172 A | * | 7/1977 | Filipescu et al. | 372/40 |
| 5,457,186 A | * | 10/1995 | Mukkala et al. | 534/15 |
| 5,497,445 A | * | 3/1996 | Imoto | 385/143 |
| 5,581,398 A | * | 12/1996 | Van Veggel et al. | 359/342 |
| 5,657,156 A | * | 8/1997 | Van Veggel et al. | 359/342 |

* cited by examiner

*Primary Examiner*—Loha Ben
(74) *Attorney, Agent, or Firm*—Randy W. Lacasse; Kevin E. Green; Lacasse and Associates

(57) ABSTRACT

The invention relates to a polymeric waveguide comprising a lanthanide ion-sensitizer complex, characterized in that the lanthanide ion is preferably neodymium(III) ion ($Nd^{3+}$), ytterbium(III) ion ($Yb^{3+}$), or erbium(III) ion ($Er^{3+}$), and the sensitizer absorbs in the 400–1200 nm region, and preferably in the 600–1000 nm region. The invention also relates to an optical device comprising the same.

20 Claims, No Drawings

POLYMERIC OPTICAL WAVEGUIDE DOPED WITH A LANTHANIDE-SENSITIZER COMPLEX

This application claims the benefit of U.S. Provisional patent application Ser. No. 60/042,355, filed Mar. 24, 1997 which is a con't of Ser. No. PCT/EP98/01286 filed Feb. 28, 1998.

FIELD OF INVENTION

The invention relates to an optical waveguide doped with a lanthanide ion-sensitizer complex. Optical waveguides doped with lanthanide ions are known from EP-A2-0,437,935, which discloses an optical waveguide composed of an $Er^{3+}$ doped fiber. The erbium ions are excited with the aid of a laser, giving a fiber containing a large number of $Er^{3+}$ ions excited to such an extent that population inversion occurs, i.e. that more $Er^{3+}$ ions are in the excited state than in the ground state. When optical beams (photons) having the same wavelength as the emission wavelength of the excited $Er^{3+}$ ions traverse the fiber, they effect the transition of the ions from the excited state to a lower energy level with transmission of light. This light has the same wavelength and phase as the photons traversing the fiber. Such a process is called stimulated emission. In this way the optical fiber acts as waveguide of the light beams.

DESCRIPTION RELATIVE TO THE PRIOR ART

The optical waveguide, as specified in EP-A2-0,437,935, is a glass fiber. For several years efforts have been made to replace optical glass fibers with optical polymeric fibers. Optical polymeric fibers have several advantages over optical glass fibers. They can be made by less complicated spinning processes, easily cut to the required size, and attached to receiving and transmitting devices. Also, they are lighter and more flexible than glass fibers. A further advantage is that the shape of the optical polymeric material is not restricted to fibers. The polymeric material can also be shaped into so-called planar waveguides. In the remainder of this description the term "optical waveguide" refers to both fibers and planar waveguides.

So far, it has not proved possible to replace lanthanide-doped optical waveguides with optical waveguides of polymeric material. This is because polymeric waveguides cannot be doped with lanthanide metals. In particular, lanthanide ions used for amplification in the telecommunication transmission windows in the near-IR are very sensitive to radiationless deactivation, which counteracts their sensitivity as optical waveguides. The deactivation is brought about by high-energy vibrations near the lanthanide ion. Most effective are O—H, N—H, and C—H vibrational modes. The risk of co-doping with water is a major problem of organic lanthanide complexes, because trivalent lanthanide ions are extremely hygroscopic. In consequence, when lanthanide ions are doped, crystallization water which is present in the lanthanide salt is also introduced into the waveguide. Alternatively, lanthanide ions already present in the waveguide may interact with water or other OH-containing impurities. Water and other OH-containing impurities quench the excited state of the trivalent lanthanide ions. So, unless further steps are taken, a lanthanide-doped optical polymeric waveguide will not show the above-indicated amplification, or not show it in sufficient degree. Furthermore, light is absorbed by OH-groups to such an extent that polymeric optical waveguides, in which OH-impurities are present, will display optical attenuation. Doping of $Er^{3+}$ ions in glass fibers ordinarily is carried out using $Er_2O_3$. This compound, however, cannot be used in polymeric optical waveguides since it fails to dissolve in polymeric material. When glass fibers contain water or OH-containing impurities, these can easily be removed by heating the fibers and drying them out. However, this is an unfortunate solution to the problem where polymeric optical waveguides are concerned, as they will usually decompose under such treatment.

OBJECT OF THE INVENTION

The present invention has for its object to obviate these drawbacks and provide a functional lanthanide-doped optical waveguide in which a polymeric waveguide is used as optical material. Hence, the invention consists in that the polymeric waveguide comprises a lanthanide ion-sensitizer complex, wherein the sensitizer absorbs in the 400–1200 nm region, and preferably in the 600–1000 nm region.

The term "complex" in this connection refers to a compound in which the lanthanide ion is encapsulated by a host molecule. If a complex is provided in which trivalent lanthanide is fully encapsulated, the lanthanide ions are not, or at any rate less, in a position to interact with water or other OH-containing impurities. Moreover, it appears that any water present when such a complex is formed is stripped off the lanthanide. A further advantage of such a lanthanide complex is that it dissolves or mixes with the polymeric material far more readily than lanthanide salts or lanthanide oxides do. This is because the host molecule comprises organic material, just as the polymeric waveguides do. Hence, it is possible for the lanthanide to be incorporated into a polymeric optical fiber in a permanently anhydrous state in the form of a complex, thus maintaining the advantages of polymeric optical fibers over glass fibers. In this way a lanthanide-doped polymeric optical waveguide is provided which has all the above-mentioned advantages of polymeric optical waveguides to boot.

An organic ligand is used as a sensitizer. The organic ligand is excited in a strong absorption band to more efficiently populate the excited state of the rare-earth ion, after which the energy is transferred to an excited state of the rare-earth ion. A significant gain in excitation efficiency can be obtained via this route. The absorption coefficients of the (forbidden transitions of the) rare-earth ions are extremely low, typically 1–10 l $mol^{-1}$ $cm^{-1}$, whereas organic ligands may have absorption coefficients which are 3–4 orders of magnitude higher, because allowed $\pi$—$\pi^*$ transitions are probed.

Preferred organic sensitizers are selected from fluorescein derivatives such as fluorexon, eosin, erythrosin, fluorescein, rose bengal, calcium green, and oregon green; triphenylmethane derivatives such as methylthymol blue, xylenol orange, brilliant blue, methyl green, and malachite green; porphyrin derivatives; rhodamine derivatives such as rhodamine 6G, tetrabromorhodamine, and lissamine; phenothiazine derivatives such as thionin and methylene blue;

phenoxazine derivatives such as nile blue; coumarin derivatives; acridin derivatives such as acridin orange; (thio)indigo derivatives; carbocyanine derivatives; squaraine derivatives; buckminster fullerenes, and (na)phthalocyanine derivatives.

These compounds and derivatives are well-known to those skilled in the art. Coumarin derivatives, for instance, include 2- and 4-coumarins such as coumarin 120, 124, 445, 450, 490, 500, 503, and trifluoromethylcoumarin. Other sensitizers which absorb in the visible region can also be employed.

The state of the art of lanthanide complexes as active material in polymeric waveguides has been disclosed in EP 618,892. Important advantages of polymeric optical waveguides, as opposed to the conventionally applied inorganic optical waveguides, are the ease of handling the polymeric materials, which entails more flexibility and possibilities as to the devices which can be prepared (e.g., hybrids of switches and waveguides, direct coupling to laser source or detector), and reduction of manufacturing costs. Another advantage when an organic complex is used in a polymer host, is that higher doping of the waveguide can be realized than with inorganic ions in an inorganic host. This requires good compatibility of complex and host, which has been realized by the complexes described in EP 618,892, wherein a net neutral complex was obtained by application of a negatively charged ligand. A disadvantage of these organic complexes is that most organic ligands contain bonds which give highly energetic vibrational modes, which bonds usually are not present in inorganic hosts, or in the case of coordinated water molecules being present in the complex, can be removed by high-temperature treatment. Obviously, such treatment cannot be applied to organic complexes, which would decompose. It is therefore vital that the organic ligand have excellent shielding properties to keep away water and other O—H and N—H containing molecules from the rare-earth ion.

Closer evaluation of the photophysical properties of the complexes described in EP 618,892 shows that they are not very suitable for application in optical amplification. For instance, the complexes containing the near-IR luminescent rare-earth ion $Er^{3+}$ exhibit rather short luminescence lifetimes (of the order of 1 $\mu s$, which is 3 orders of magnitude below the lifetimes in inorganic matrices). Quenching effects are very pronounced for the near-IR emitting rare-earth ions, since they have excited states which are separated from the ground state by a slight energetic distance, so that they can be easily depopulated. Sensitized emission of the rare-earth ion with these applied complexes can only be achieved for excitation in the UV region (below 300 nm). Powers of several hundreds of mW are required to get optical amplification in such polymeric optical waveguides, which is not practical. Moreover, the use of excitation in the UV region is undesired in view of the inherent reactivity of the highly energetic photons and the significant propagation losses encountered due to the enhanced scatter efficiency and increased absorption values for the short wavelength light.

The advantage of the present invention is that the problems noted above have been overcome by the introduction into the complex of a sensitizer which absorbs in the visible region and is able to efficiently transfer its energy to the near-IR luminescent rare-earth ion. The present approach compensates for the reduction of the lifetime of the luminescent state, since the excitation efficiency is enlarged by 3 or 4 orders of magnitude. This results in a polymer-based fiber waveguide with the same or a better performance than that of the inorganic amplifiers, but with all the advantages of using polymer-based components. Such waveguides can be advantageously applied in optical devices, preferably those having a transversal pump configuration.

A survey of near-IR luminescence of the rare-earth metal ions of the invention is presented in Tables 1 and 2. Luminescence lifetimes ($\tau_{lum}$) have been determined with a germanium detector (liquid nitrogen cooled) for lifetimes longer than 0.25 $\mu s$, or with a near-IR sensitive photomultiplier for the shorter lifetimes. Table 1 demonstrates the advantageous properties of neodymium, ytterbium, and erbium with respect to the other lanthanide metals.

TABLE 1

Luminescence of $Ln^{3+}$-fluorexon complexes ($\lambda_{exc}$ = 500 nm, $10^{-6}$ M)

| Rare-earth ion | Solvent | $\lambda_{lum, max}$ (nm) | $t_{lum}$ ($\mu s$) |
|---|---|---|---|
| neodymium | $D_2O$ | 880 | 0.3 |
| | | 1060 | |
| | | 1320 | |
| erbium | $D_2O$ | 1530 | 2.5 |
| ytterbium | $D_2O$ | 980 | 6.0 |
| | | 1030 | |

TABLE 2

Luminescence of $Ln^{3+}$-calix[4]arene-fluorescein complexes ($\lambda_{exc}$ = 500 nm, $10^{-5}$ M)

| Ligand | Rare-earth ion | $t_{lum}$ in MeOD-$d_4$ ($\mu s$) | $t_{lum}$ in DMSO ($\mu s$) |
|---|---|---|---|
| $C_3$-acid | neodymium | 0.8 | 1.3 |
| | erbium | 0.9 | 1.6 |
| $C_6$-acid | neodymium | 0.9 | 1.2 |
| | erbium | 0.8 | 1.7 |
| $C_6$-amide | neodymium | 0.7 | n.d. | n.d. = not determined

Of the rare-earth ions which have been examined, neodymium and erbium are the most suitable ones for application in optical waveguides, since they show emission in the wavelength regions applied in optical tele communication and data communication, i.e. around 1300 nm for $Nd^{3+}$ and 1530 nm for $Er^{3+}$. $Nd^{3+}$ can also be applied for amplification in the 880 nm and 1060 nm range. $Yb^{3+}$ is very suitable for amplification in the 980 nm region.

Compounds which are suitable for application as near-IR luminescent-active material in polymeric optical waveguides comprise several characteristic building blocks, i.e., a) a near-IR luminescent rare-earth ion, e.g., erbium, ytterbium, or neodymium ion, or a combination thereof, b) a sensitizing moiety which is efficiently excited and able to transfer energy to the rare-earth ion. The sensitizing moiety should be as close to the ion as possible to make the energy transfer process more efficient.

c) a complexing agent (chelator or ligand) which shields the ion from quenching by solvent molecules, in particular from water which contains an O—H moiety with particular quenching ability, and provides strong binding to the ion. It is desirable to provide the complexing agent with a site which can act as the sensitizer.

d) optionally, a functional group which covalently attaches the complex to a polymer, e.g. via an isothiocyanate, activated ester (such as N-hydroxysuccinimidyl ester), epoxide, or maleimide for coupling to amino groups; an amino group for coupling to epoxides; a maleimide or a halogenoacetamide for coupling to thiols; a hydroxy for reaction with acid chloride, isocyanate, or chloroformate; or a hydrazide for coupling to aldehydes, all of which methods are well-known to the artisan. Covalent attachment is optional, because the compound can be suitably applied also when it is present in the polymer as solid solution.

The near-IR luminescent complexes enable the design of low-cost excitation sources: thus visible light which can be obtained via inexpensive light sources, such as solid-state lasers, light emitting diodes, or conventional lamps, can be used for excitation.

The combination of organic ligands and rare-earth ions results in an improvement of the photochemical stability of the compounds. The triplet state of the sensitizer is efficiently quenched by the rare-earth ion, so that the effective lifetime of this state is significantly reduced, and no or at least less reactive singlet oxygen is formed.

To demonstrate the applicability of the proposed approach two sets of complexes have been investigated, i.e.:

a) complexes with a rare-earth ion in direct interaction with a sensitizer, such as fluorexon, which is a fluorescein derivative with a number of complexing groups; and b) complexes with a rare-earth ion in interaction with a structural moiety of an organic molecule (e.g., a calix[4]arene) which provides sufficiently strong complexation behavior, sufficient coordinative groups to reduce the number of water molecules in the immediate vicinity of the rare-earth ion, and a sensitizer, preferably with coordinative groups attached to it. Preferably, the sensitizer contains a moiety which may provide interaction with the rare-earth ion (e.g., a diaza- or carboxylic acid moiety).

Examples of the direct interaction type, i.e. sensitizers with complexing ability, are fluorescein and derivatives thereof (e.g., fluorexone, eosin, erythrosin, fluorescein, Rose Bengal or tetrachloro-tetraiodofluorescein, Calcium Green, and Oregon Green), triphenylmethane derivatives (e.g., Methylthymol Blue, Xylenol Orange, Malachite Green, and Brilliant Blue), and porphyrins/texaphyrins, or (na) phthalocyanins.

Examples of the indirect interaction type are calix[4] arenes, β-diketonates, and polyaminocarboxylic acids, such as EDTA, DTPA, and TRHA, all basically containing aminocarboxylate groups as complexing agents. Other complexing agents are, e.g., pyridinecarboxylic acid derivatives, or—in general—any type of compound containing oxygen, nitrogen, phosphorous, or sulfur moieties which have complexing ability towards rare-earth metal ions.

Other examples of suitable sensitizers are rhodamine derivatives (e.g., Rhodamine 6G, tetrabromorhodamine, and Lissamine), thionin derivatives (e.g., thionin and Methylene Blue), acridin derivatives (e.g., Acridin orange), Nile Blue, Methyl Green, benzophenone derivatives (e.g., Michler's Ketone and bisdimethylaminothiobenzophenone), and (thio) indigo. Also suitable are $C_{60}$, $C_{70}$, and $C_{82}$ buckminster fullerenes and endofullerenes.

When optical lanthanide-doped waveguides are co-doped with $Yb^{3+}$, the ytterbium ion is excited. The excited $Yb^{3+}$ ion can transfer its energy to another lanthanide ion, which will be excited in turn.

The invention is further illustrated by the following examples.

EXAMPLE 1

Fluorexon was commercially obtained and used without further purification. The lanthanide ions were added from stock solutions of $YbCl_3.6H_2O$, $NdCl_3.6H_2O$, and $ErCl3.6H_2O$ in $D_2O$ or $H_2O$. Fluorexon, a well-known fluorescence indicator for $Ca^{2+}$ ions, was used to sensitize the near-IR (NIR) emission of trivalent ytterbium, neodymium, and erbium ions. Its absorption spectrum was similar to that of fluorescein, with an absorption maximum at 490 nm.

Solutions were prepared consisting of $5 \times 10^{-6}$ M of the fluorexon and an equimolar amount of lanthanide ions ($Yb^{3+}$, $Nd^{3+}$, or $Er^{3+}$) in $D_2O$ at pD 7. The pD was carefully controlled using an ISFET-based pH meter and concentrated solutions of DCl and NaOD.

The NIR luminescence excitation spectra of the respective $Nd^{3+}$ and $Er^{3+}$ complexes are identical to the spectrum of the fluorexon/$Yb^{3+}$ complex, and all match the corresponding absorption spectra, with an excitation maximum at 490 nm. These results indicate that energy transfer from the fluorexon to the lanthanide ion is the dominant route to the observed rare-earth ion NIR luminescence and that this process is several orders of magnitude more efficient than direct excitation of the lanthanide. In the used concentration range no luminescence was observed when an absorption band of the rare-earth ion was excited.

EXAMPLE 2

Synthesis of Fluorescein-containing Calix[4]arene-based Triacids (9a) and (9b) (According to Scheme I)

p-Tert-butylcalix[4]arene (1) was converted to 25-mono [(carboxylate)-methoxy]-26,27,28-tris[(ethoxycarbonyl)-methoxy]calix[4]arene (3) (R=t-Bu or H) according to literature procedures (F. Arnaud-Neu et al., *J. Am. Chem. Soc.*, 111 (1989) 8681; V. Böhmer et al., *J. Chem. Soc. Perkin Trans. I* (1990) 431) and converted to the triethylester monoacid chloride (4) by refluxing in oxalyl chloride. Compound (4) was coupled to 1 mol eq of the appropiate mono-BOC-protected diamine (x=6 or 3) in dichloromethane, in the presence of triethylamine as a base. Both products (5a) and (5b) were obtained as pure products in ~80% yield.

Scheme I

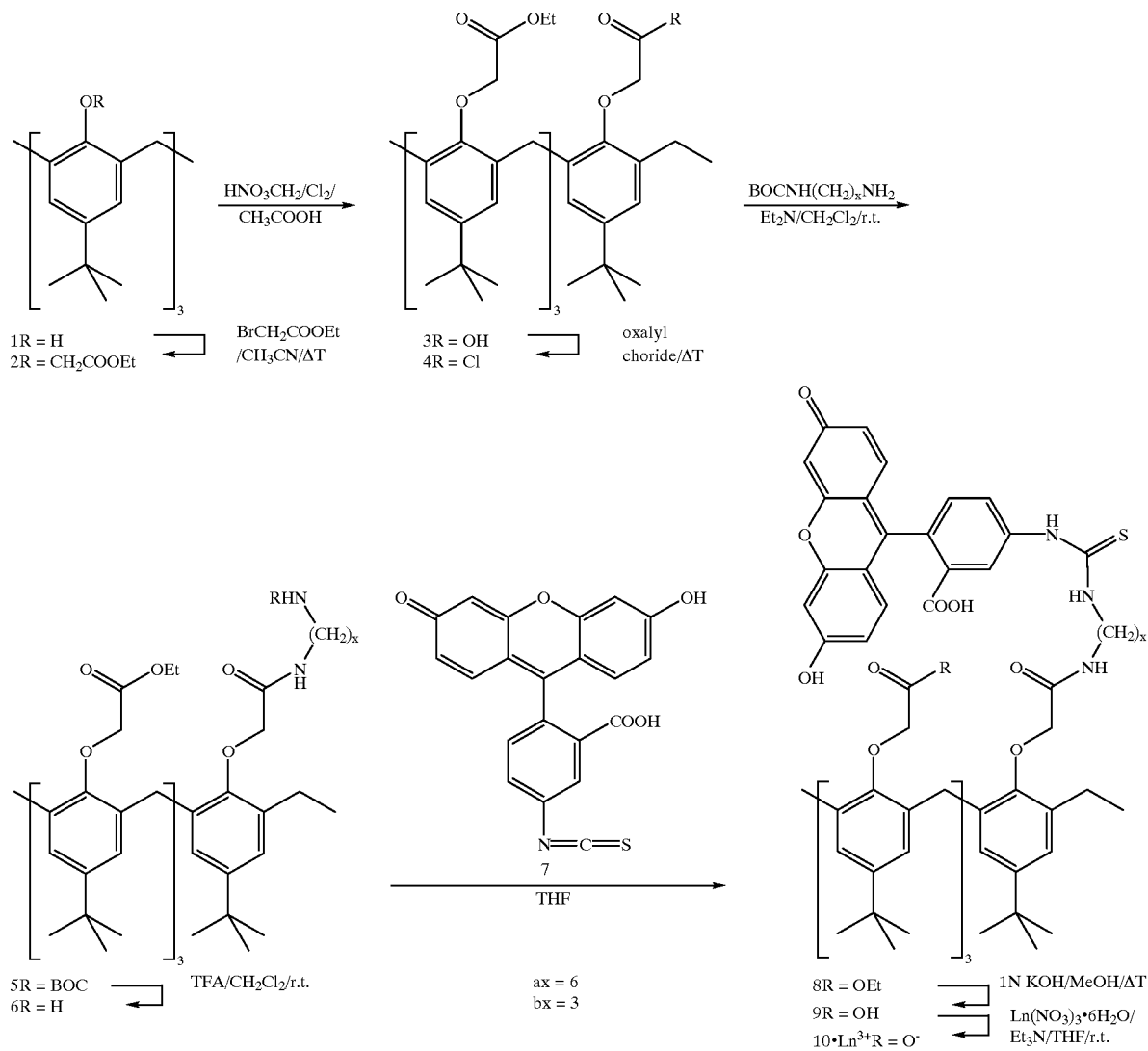

Subsequently, the BOC group was cleaved by the addition of trifluoroacetic acid to a solution of (5a) or (5b) in dichloromethane. The free amines (6a) and (6b) were obtained in 80% to quantitative yield after basic work-up. The free amines were reacted with the isothiocyanate-functionalized fluorescein (7a) and (7b) in tetrahydrofuran (THF) at room temperature. After purification by Sephadex column chromatography, the products (8a) and (8b) were obtained as pure products in 88% and 70% yield, respectively. The hydrolysis of the triesters (8a) and (8b) was performed with an aqueous 1N potassium hydroxide solution in refluxing methanol. The triacids were deprotonated with triethylamine in THF and complexed with 1 mol eq of the appropiate lanthanide nitrate. The complex precipitated from the reaction mixture after the addition of 4 eq of triethylamine. The complexes were isolated by centrifuging and washed with THF. The complete deprotonation leading to carboxylate groups was shown by IR spectroscopy showing a vibration at 1581–1597 cm$^{-1}$ for the carboxylate groups, whereas the C=O stretch vibration of the triacids (9a) and (9b) appeared at 1754–1762 cm$^{-1}$.

EXAMPLE 3

Synthesis of Fluorescein-containing Triamide (According to Scheme II)

The synthesis of the calix[4]arene triamide (16) bearing a fluorescein moiety as a sensitizer was performed via the precursor (15). The synthesis of (15) was performed by monoprotection of p-tert-butylcalix[4]arene with 3-bromo-1-propene in N,N-dimethylformamide using cesium fluoride as a base Calix[4]arene (11) was then trialkylated with 2-chloro-N,N-diethylacetamide in acetonitrile in the presence of a catalytic amount of potassium iodide and potassium carbonate as a base. After work-up and crystallization from acetonitrile, compound (12) was obtained in 57% yield. Deprotection to (13) was performed in a mixture of ethanol and water with Pd(PC$_6$H$_5$)$_4$ and triethylamine formic acid complex. The product was recrystallized from acetonitrile and obtained pure in 77% yield. The triamide (15) was obtained by reacting compound (13) with the chloroacetyl chloride of the BOC-protected amine with a catalytic amount of potassium iodide and potassium carbonate as a base. The acidic work-up of (14) provided the calix[4]arene triamide (16) in 64% yield.

The reaction of the isothiocyanate-functionalized fluorescein (7) to (15) was performed in THF at room temperature The product was obtained in 93% yield. The triamide (16) was dissolved in a mixture of acetonitrile and methanol (3:1 v/v), and 1 eq of $Nd(NO_3)_3 \cdot 5H_2O$ in acetonitrile was added. After refluxing overnight the reaction mixture remained clear and the photophysical studies were performed in situ.

excitation spectra clearly evidenced their most prominent maximum at 500 nm, the main visible absorption wavelength of fluorescein. In the complex form, the direct emission from fluorescein itself was strongly reduced in the presence of the lanthanide ion. Upon excitation at 500 nm, the typical Nd (III) ion luminescence at 880, 1060, and 1320 nm was observed. Similarly the Er(III) ion emission at 1530 nm was obtained. Luminescence lifetimes were obtained with a modified Edinburgh Instruments LP900 spectrofluorimeter. A fast liquid nitrogen cooled Ge-detector was applied to record the luminescence lifetimes. The time-resolved response of a solution of the lanthanide complex to a short-lived pulse from a nitrogen laser was recorded with

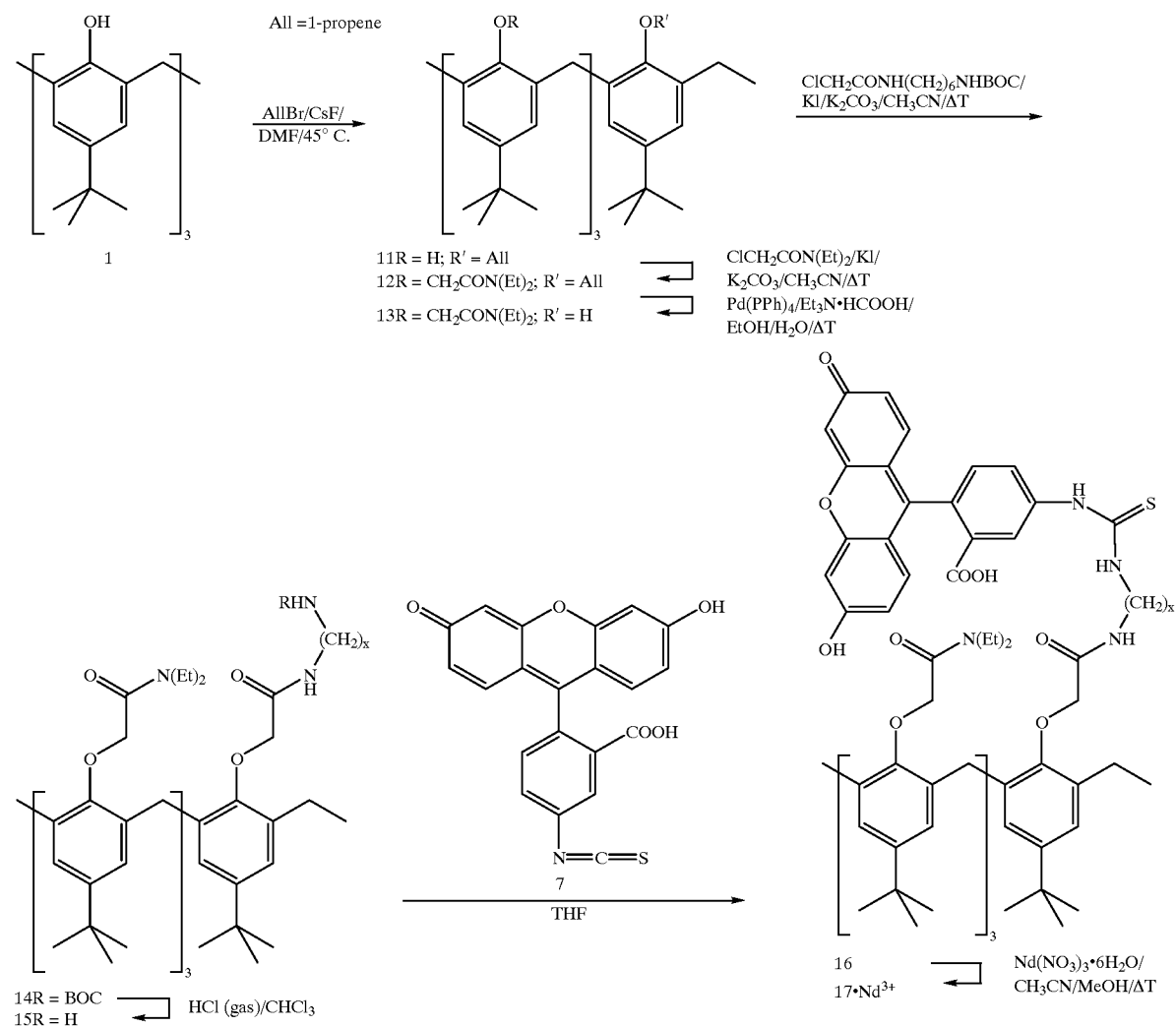

Scheme II

The lanthanide-calix[4]arene-fluorescein complexes were examined via luminescence spectroscopy. Steady-state luminescence spectra were recorded with a PTI Alphascan spectrofluorometer, equipped with a liquid nitrogen cooled Ge-detector for the near-IR (800–1650 nm) wavelength range. All three (C3- and C6-acid and C6-amide) complexes of both $Er^{3+}$ and $Nd^{3+}$ showed efficient energy transfer:

a fast digital oscilloscope. Luminescent lifetimes of the complexes were of the order of 1 $\mu$s.

Both the steady-state and time-resolved luminescence measurements convincingly demonstrate the efficient energy transfer from the organic sensitizer fluorescein, which is excited in the visible part of the spectrum, to the near-IR luminescent rare earth ions Nd(III) and Er(III).

An overview of the lanthanide ion complexes is given in the Table:

Characterization of the lanthanide ion complexes.

|  | 10a Nd$^{3+}$ | 10b Nd$^{3+}$ | 10a Er$^{3+}$ | 10b Er$^{3+}$ | 17 Er$^{3+}$ |
|---|---|---|---|---|---|
| Mp. (° C.) | >280 | | | | |
| IR (cm$^{-1}$) | 3406, 1590 | 3430, 1581 | 3433, 1584 | 3438, 1597 | 3422, 1669,[a] 1635 |

[a]weak band.

EXAMPLE 4

A solution of 1.0 g of a poly(carbonate-co-acrylate) copolymer with weight averaged molecular weight 24,900, containing hexafluorobisphenol-A and a propylmethacrylate derivative, 0.03 g of lissamine-calixarene-neodymium complex, and 0.05 g of the thermal initiator dicumylperoxide in 2.33 g of cyclopentanone was filtrated through a 200 nm filter and subsequently spin coated at 3000 rpm (30 s) onto a silicon wafer. The silicon wafer had been treated so that the top 3 µm were oxidized. The spin coated wafer was cured in a vacuum oven for 2 h at an effective temperature of 150° C. The thickness of the resulting crosslinked polymer film was 3 µm.

The film was illuminated from the top with the 515 nm line of an argon-ion laser, which was in resonance with the main absorption band of the lissamine sensitizer. At the side of the planar waveguide clearly sensitized emission of the neodymium(III) ion, with maxima at 880 nm, 1060 nm, and 1320 nm, was measured. Wavelengths were separated with a mono-chromator and the emitted light was detected with a liquid nitrogen cooled germanium detector. The luminescence lifetime was measured with a photomultiplier tube and amounted to 0.77 µs.

To establish the efficiency of the polymer optical amplifier, the 1064 nm light from a CW Nd:YAG laser was butt coupled into the planar waveguide established by the doped polymer layer, the thin oxidized silicon layer, and air. The intensity of the guided light leaving the waveguide was measured with a multimode fiber coupled to an optical spectrum analyzer. The intensity of the 1064 nm laser light at the end of the waveguide was measured with and without illumination of the waveguide from the top with a 515 nm argon-ion laser. A circle of about 5 mm in diameter was illuminated at a power of 400 mW, right at the end of the waveguiding structure. When only the 515 nm laser illuminated the polymer waveguide (1064 nm signal laser switched off), no light was detected with the spectrum analyzer. When the 1064 nm laser was coupled into the fiber with the 515 nm laser switched off, the spectrum analyzer detected a signal with its maximum at 1064 nm with a total intensity of −54 dB; when the 515 nm laser was switched on, the intensity of the transmitted light increased to −48 dB.

What is claimed is:

1. A polymeric optical waveguide comprising a lanthanide ion-sensitizer complex, characterized in that a sensitizer absorbs in the 400 nm–1200 nm region.

2. The polymeric optical waveguide of claim 1 wherein a lanthanide ion is neodymium (III) ion (Nd$^{3+}$), ytterbium (III) ion (Yb$^{3+}$), or erbium (III) ion (Er$^{3+}$).

3. The polymeric optical waveguide of claim 2 wherein a sensitizing moiety is selected from flourescein derivatives; triphenylmethane derivatives; porphyrin derivatives; rhodamine derivatives; phenothiazine derivatives; phenoxazine derivatives; coumarin derivatives; acridin derivatives; (thio)indigo derivatives; carbocyanine derivatives; squaraine derivatives; buckminster fullerenes, and (na)phthalocyanine derivatives.

4. The polymeric optical waveguide of claim 3 comprising:
   a) a near-IR luminescent rare-earth ion;
   b) a sensitizing moiety which is efficiently excited and able to transfer energy to the rare-earth ion; and
   c) a complexing agent which shields the rare-earth ion from quenching by solvent molecules.

5. The polymeric optical waveguide of claim 4 wherein the near-IR luminescent rare-earth ion is selected from at least one of erbium, ytterbium, and neodymium ion.

6. The polymeric optical waveguide of claim 4 wherein the complexing agent is the sensitizing moiety.

7. The polymeric optical waveguide of claim 4 further comprising a functional group which covalently attaches the complex to a polymer.

8. An optical device comprising the polymeric optical waveguide of claim 3.

9. The polymeric optical waveguide of claim 2 comprising:
   a) a near-IR luminescent rare-earth ion;
   b) a sensitizing moiety which is efficiently excited and able to transfer energy to the rare-earth ion; and
   c) a complexing agent which shields the rare-earth ion from quenching by solvent molecules.

10. The polymeric optical waveguide of claim 9 wherein the near-IR luminescent rare-earth ion is selected from at least one of erbium, ytterbium, and neodymium ion.

11. The polymeric optical waveguide of claim 9 wherein the complexing agent is the sensitizing moiety.

12. The polymeric optical waveguide of claim 9 further comprising a functional group which covalently attaches the complex to a polymer.

13. An optical device comprising the polymeric optical waveguide of claim 2.

14. The polymeric optical waveguide of claim 1 wherein the sensitizer absorbs in the 600 nm–1000 nm region.

15. The polymeric optical waveguide of claim 1 wherein a sensitizing moiety is selected from flourescein derivatives; triphenylmethane derivatives; porphyrin derivatives; rhodamine derivatives; phenothiazine derivatives; phenoxazine derivatives; coumarin derivatives; acridin derivatives; (thio)indigo derivatives; carbocyanine derivatives; squaraine derivatives; buckminster fullerenes, and (na)phthalocyanine derivatives.

16. The polymeric optical waveguide of claim 1 comprising:
   a) a near-IR luminescent rare-earth ion;
   b) a sensitizing moiety which is efficiently excited and able to transfer energy to the rare-earth ion; and c) a complexing agent which shields the rare-earth ion from quenching by solvent molecules.

17. The polymeric optical waveguide of claim 16 wherein the near-IR luminescent rare-earth ion is selected from at least one of erbium, ytterbium, and neodymium ion.

18. The polymeric optical waveguide of claim 16 wherein the complexing agent is the sensitizing moiety.

19. The polymeric optical waveguide of claim 16 further comprising a functional group which covalently attaches the complex to a polymer.

20. An optical device comprising the polymeric optical waveguide of claim 1.

* * * * *